(12) United States Patent
Bismuth et al.

(10) Patent No.: US 8,160,318 B2
(45) Date of Patent: Apr. 17, 2012

(54) METHOD FOR PROCESSING IMAGES IN INTERVENTIONAL RADIOSCOPY TO DETECT GUIDING INSTRUMENTATION EQUIPMENT

(75) Inventors: Vincent Bismuth, Paris (FR); Vincent Auvray, Paris (FR); Jean Lienard, Ingy (FR); Régis Vaillant, Villebon sur Yvette (FR)

(73) Assignee: General Electric Company, Schenectady, NY (US)

( * ) Notice: Subject to any disclaimer, the term of this patent is extended or adjusted under 35 U.S.C. 154(b) by 973 days.

(21) Appl. No.: 12/139,579

(22) Filed: Jun. 16, 2008

(65) Prior Publication Data
US 2009/0022376 A1    Jan. 22, 2009

(51) Int. Cl.
*G06K 9/00* (2006.01)
(52) U.S. Cl. .................................................. 382/128
(58) Field of Classification Search .................. 382/128
See application file for complete search history.

(56) References Cited

U.S. PATENT DOCUMENTS

| 5,351,305 A | 9/1994 | Wood et al. |
| 5,467,380 A | 11/1995 | De Jonge et al. |
| 5,684,720 A | 11/1997 | Hein |
| 6,574,300 B1 | 6/2003 | Florent et al. |
| 7,986,854 B2 * | 7/2011 | Kim et al. ............... 382/275 |
| 2009/0136112 A1 * | 5/2009 | Bismuth et al. ........... 382/132 |

FOREIGN PATENT DOCUMENTS
WO    WO 2007/054862    5/2007

OTHER PUBLICATIONS

Geusebroek J. et al: "Fast anisotropic gauss filtering" IEE Transactions on Image Processing, IEEE Service Center, Piscataway, NJ, US, vol. 12, No. 8, aoQt 2003(Aug. 2003), pp. 938-943, XP011099199 ISSM: 1057-7149.

Freeman W.T. et al: "The Design and Use of Steerable Filters" IEEE Transactions on Pattern Analysis and Machine Intelligence, IEEE Service Center, Los Alamitos, CA, US vol. 13, No. 9, Sep. 1, 1991, pp. 891-006, XP000231520.

* cited by examiner

*Primary Examiner* — Dixomara Vargas
(74) *Attorney, Agent, or Firm* — Global Patent Operation; Jonathan E. Thomas (57) ABSTRACT

A method for processing images in interventional radioscopy for detecting guiding instrumentation equipment. The method of the invention enables objects of longilinear or very curved shapes to be detected within the radioscopic image having very low contrast to noise ratios. In one embodiment, an algorithm enables the measured contrast to noise ratio of long or curved structures in the image to be considerably improved. To do this, an embodiment of the invention uses oriented, separable, recursive and rapid steerable detection filters. Said detection filters have a low calculation cost, even for long filters having several orientations.

17 Claims, 4 Drawing Sheets

METHOD FOR PROCESSING IMAGES IN INTERVENTIONAL RADIOSCOPY TO DETECT GUIDING INSTRUMENTATION EQUIPMENT

CROSS-REFERENCE TO RELATED APPLICATIONS

This application claims priority under 35 U.S.C. §119(a)-(d) to prior-filed, co-pending French patent application serial number 0756256, filed on Jul. 3, 2007, which is hereby incorporated by reference in its entirety.

BACKGROUND

1. Field of the Invention

The field of the invention relates to medical imaging generally, and more particularly, to radioscopy.

2. Description of Prior Art

Radioscopy is nowadays widely used for diagnostic and therapeutic operations carried out under imaging control. Radioscopy is a functional imaging method that consists in observing the image of internal organs produced on an X-ray detector by interposing the body between said detector and a beam of X-rays. Radioscopy brings into relation imaging, the guiding instrumentation equipment and the practitioner.

Interventional radioscopy typically involves the introduction of guiding instrumentation equipment such as a catheter equipped with a specific device into the vascular bed of the patient to carry out an intervention, in association with an injection of contrasting agent to make the vessels temporary visible. The progression of the manipulation of the equipment is viewed and is controlled by means of X-rays.

Compared to surgery, this interventional approach can be carried out without making any major cut or incision and leads to a much shorter recovery time and stay in hospital.

However, this type of radioscopy device has disadvantages. Indeed, the radioscopic images are viewed in real time with an intensity of the beam of X-rays spread out over a long time. For an average examination, the total quantity of X-rays emitted during the exposure is high, which can thereby cause a too high irradiation. Such irradiations lead in the short and the long term to health problems both for the patient and for the medical personnel. To aid the resolution of this problem of irradiation, there exists in the background art a conventional solution consisting in reducing the intensity of the beam of X-rays by around 100 times compared to the intensity of the beam of X-rays in a standard radiographic examination.

The immediate consequence of the use of a relatively low intensity is a reduction in the quality of the image compared to radiography. This reduction in quality manifests itself in a significant deterioration in the signal to noise ratio of the content of the images, observable through the scintillation and the granularity of the image, which commonly results in a noisy image.

Moreover, the reduction in the intensity of the beam of X-rays deteriorates the visibility of the guiding instrumentation equipment. The time spent carrying out the intervention is increased by the difficulty that the physician encounters in correctly viewing his guiding equipment. In the case of a guide constituted of a metal wire of low thickness, the radio opacity is low. Consequently, the guiding equipment has a very low contrast to noise ratio in the image. This contrast to noise ratio is typically between 1 and 4 in fluoroscopy and can sometimes drop below 1. The detection of pixels belonging to the guiding equipment is thereby difficult to implement due to the fact of their very low contrast to noise ratio in the image.

At present, steerable filtering methods exist that enable linear structures in an image to be detected or highlighted.

Examples of this type of steerable filtering are described in the following documents:

"The design and use of steerable filters," Freeman and Adelson, IEEE trans. Patt. Anal. And Machine Intell., Vol. 13, No. 9, pp. 891-906, September 1991.

Danielsson, P.-E. and Q. Ye (1988). "A new procedure for line enhancement applied to fingerprints," In E. S. Gelsema and L. N. Kanal (Eds.), Pattern Recognition and Artificial Intelligence, the Third Pattern Recognition in Practice workshop, Amsterdam, pp. 49-61.

"Recursive Gaussian Derivative Filters," Proceedings of the 14th International Conference on Pattern Recognition, ICPR'98, Brisbane (Australia), 16-20 Aug. 1998, IEEE Computer Society Press, Vol. I, pp. 509-514.

"Fast anisotropic gaussian filtering," IEEE TRANSACTIONS ON IMAGE PROCESSING, VOL. 12, NO. 8, August 2003.

However the filterings described in the above documents have disadvantages. Indeed, these filters are not suited to the detection in a radioscopic image of an object as longilinear as a guiding equipment and having such a low contrast to noise ratio.

SUMMARY OF THE INVENTION

Embodiments of the claimed invention relate to a method for processing images in interventional radioscopy by a family of oriented, separable and recursive filters for improved detection of guiding instrumentation equipment. Embodiments of the invention have particularly advantageous, though not exclusive, applications in the medical imaging and radiography fields, and aim to compensate for the disadvantages of the above-mentioned techniques. To achieve this aim, a method for processing images is proposed that makes it possible to attribute to each pixel of the image a value that reflects a confidence level to allocate to said pixel as regards its belonging to a longilinear object. In practice, these longilinear objects are guiding instrumentation equipment, which are in particular catheters or guides used in interventional radiology.

In radioscopic imaging, the guiding instrumentation equipment have common properties, namely the lengthening of their structures and their virtually equal diameters. For example, a guide is considered by practitioners as a longilinear object of diameter virtually equal to that of one of the contours of the catheter. Indeed, the catheter, which is a hollow cylinder, is represented in a radioscopic image by two parallel contours, each contour being very similar to a guide.

For the detection of this guiding equipment, an embodiment of the invention uses a filtering algorithm that enables detection of particular objects of longilinear shape having very low contrast to noise ratios. In another embodiment, the filtering algorithm is adapted to detect objects of very curved shapes.

The detection of longilinear objects is implemented, in one embodiment, by a family of oriented, separable, recursive and rapid steerable detection filters. These detection filters have a low calculation cost even for long filters having several orientations.

An algorithm used by embodiments of the invention are configured to measure the contrast to noise ratio, which is a common measurement in X-ray imaging, to quantify the visibility and the detectability of the equipment in the image. The algorithm further enables the measured contrast to noise ratio to be considerably improved.

In one embodiment, the lower this measurement in absolute value, the less chance there is of a pixel belonging to a longilinear object. The higher this measurement in absolute value, the greater chance there is of a pixel belonging to a longilinear object.

Consequently, use of the algorithm outputs a confidence map. This confidence map is a set of values attributed to the pixels of the image that provide information on the confidence level that one may assign to a pixel as regards its belonging to a longilinear object.

An algorithm used by embodiments of the invention further enables the position of the pixels of guiding equipment in the image to be indicated by highlighting them. It further enables the pixels belonging to this guiding equipment to be distinguished in an automatic manner from the background image.

An algorithm used by an embodiment of the invention may output an orientation image that represents a local principal direction in each pixel.

A map outputted by an algorithm used by embodiments of the invention may be used subsequently, in particular to:
  detect the guiding equipment,
  improve the visibility of said equipment in the image,
  filter the image while preserving the pixels of said guiding equipment,
  transmit the confidence map and the orientation image to a noise reduction algorithm to perform a temporal or spatial noise reduction.

The confidence map and the orientation image that are provided in one embodiment of the invention may be combined to perform an enhancement of one or more structures of interest.

The orientation image provided by an embodiment the invention may be used to determine in each pixel the most suitable filter, which will be able to adapt itself to the direction of the guiding equipment.

Embodiments of the invention thereby enable creation of a confidence map and an orientation image, the use of which can considerably improve the quality of subsequent processing to be performed on the radioscopic images. This map and this orientation image make it possible to optimize the detection of interventional guiding equipment.

An algorithm used by an embodiment of the invention may easily be implemented in an X-ray device, or in any medical imaging machine or inspection unit. It may be implemented in any conventional computer for processing images, or in more sophisticated devices, if necessary to be performed in real time and accompany the medical intervention. It has the advantage of being able to be performed in real time on the calculation devices commonly used in interventional radiology and cardiology by X-rays. It provides a confidence map and an orientation image, the use of which is simple and intuitive.

More precisely, an embodiment of the present invention relates to a method for processing images produced by a radioscopy device. The method may include
  exposing a body of a patient to radiation;
  obtaining, via a detector, a raw image representative of an internal structure of the body; and
  determining a family of two-dimensional steerable filters to apply to the raw image.

The method may further include determining for each filter of the family of filters an orientation $\theta i$ within a range of orientations, where $\theta i$ is defined beforehand, i belongs to the interval [1,n], and n is equal to the number of filters of the family of filters to be generated.

The method further includes, for each orientation $\theta i$, separating the corresponding filter into two mono-dimensional filters. In one embodiment, these filters include:
  a constant filter along one direction, and
  a non constant filter along another direction.

The method further includes
  for each orientation $\theta i$, one formulating the mono-dimensional constant filter into a discrete mono-dimensional constant filter.

The method further includes, for each orientation $\theta i$, formulating the discrete mono-dimensional constant filter in a recursive manner.

The method further includes, for each orientation $\theta i$, applying successively to the raw image the recursive discrete constant filter and the non constant filter.

The method further includes combining all of the responses obtained by an application to the raw image of the filters of the family of filters (e.g., the constant and non constant filters referenced above) at each orientation $\theta i$, producing a confidence map from the responses of the combined filters, and producing an orientation image from the responses of the filters.

An embodiment of the invention is an X-ray device configured to use said method of processing images in interventional radioscopy to detect guiding instrumentation equipment.

BRIEF DESCRIPTION OF DRAWINGS

Embodiments of the invention may best be understood by reference to the following detailed description taken in conjunction with the accompanying drawings. These drawings are provided as an indication only and should in no way limit the scope of embodiments of the invention as claimed.

DETAILED DESCRIPTION OF EMBODIMENTS OF THE INVENTION

Figure 1:
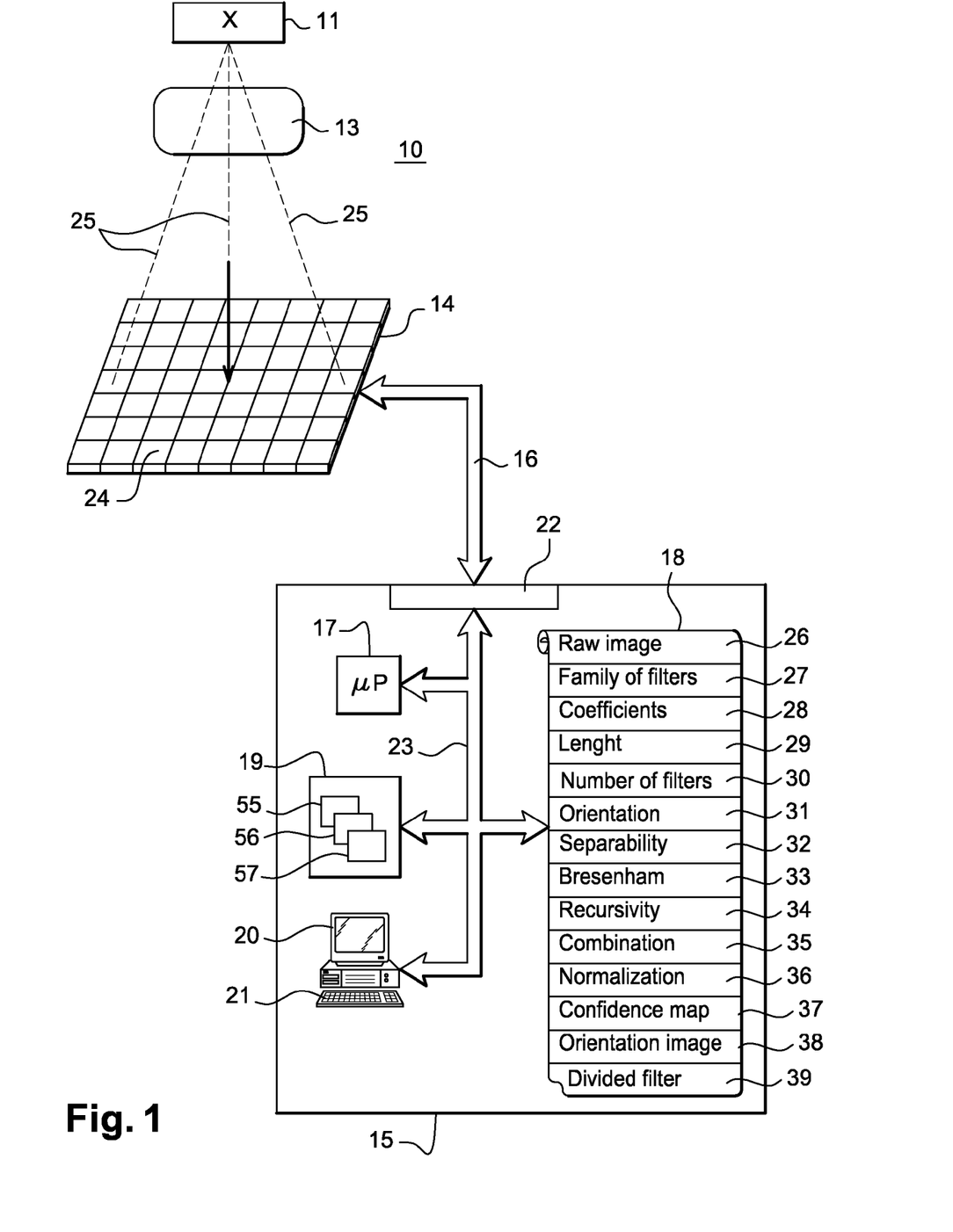
FIG. 1 shows a device for producing radioscopic images implementing an image processing method, as set forth in an embodiment of the invention.

FIG. 1 illustrates a device for producing radioscopic images using a method for processing radioscopic images as set forth in an embodiment of the invention. Radioscopy is a medical imaging system that enables a dynamic radiological image to be obtained, in other words a sequence of images, or a video of the patient. This tool is used for diagnostic and interventional purposes, in other words during the treatment of the patient, by assisting an intervention on the patient. Radioscopy is for example used to assist an angiography (diagnostic) or an angioplasty (interventional act).

The images produced by the production device 10 result from the detection of an incident irradiation from a radiation source 11 to which the patient 13 is exposed. The device 10 further comprises an image detector 14 and a control logic 15.

The image detector 14 emits electrical signals corresponding to the energy of the rays received. These electrical signals may then be transmitted to the control logic 15 through the intermediary of an external bus 16. The image detector 14 is thereby electrically coupled to the control logic 15.

The electrical signals enable the control logic 15 to produce an image corresponding to the part of the body analyzed. These images may be viewed by means of a screen of this control logic 15 or printed or memorized.

In one example, the control logic 15 comprises a microprocessor 17, a program memory 18, a data memory 19, a display screen 20 equipped with a keyboard 21 and an input output interface 22. The microprocessor 17, the program memory 18, the data memory 19, the display screen 20 equipped with a keyboard 21 and the input output interface 22 are interconnected by an internal bus 23.

The detector 14 comprises a multitude of pixels 24 arranged along two dimensions. The first dimension is the X-axis x and the second dimension is the Y-axis y. The image is thus divided up into lines and into columns corresponding to a matrix of size (n×m). The control logic 15 enables a measurement of a charge created in each respective pixel of the detector 14, in response to an incident irradiation.

At the time of a radiological exposure, a radiation dose 25 is sent by the radiation source 11 into the body 13 of the patient. This dose 25 passes through the body 13 of the patient and is received by the image detector 14. The dimensions of the image processed by the control logic are preferably the same as those of the initial image. They are those of a matrix, in one example of 1024×1024 pixels, 512×512 pixels or 256×256 pixels or other, or even a non-square matrix. These dimensions are not limitative and may be changed for the needs of an embodiment of the invention.

The image received by the detector 14 must be able to be viewed by a medical practitioner or a specialist in the field of medical imaging. However, after the passage by the image detector 14, this image remains a raw and unprocessed image. It comprises artifacts, and especially a noise due to the nature of the radiation and a noise due to the nature of the detector.

In practice, when one lends an action to a device, it is performed by a microprocessor of the device controlled by instruction codes saved in a program memory of the device. The control logic 15 is such a device. The control logic 15 is often made in the form of integrated circuit.

The program memory 18 is divided into several zones, each zone corresponding to instruction codes to perform a function of the device. The memory 18 comprises, as set forth in alternative embodiments of the invention, a zone 26 comprising instruction codes to load in the data memory 19 the raw image to be processed. The memory 18 comprises a zone 27 comprising instruction codes to create a family of steerable two-dimensional filters to apply to the raw image.

The memory 18 comprises a zone 28 comprising instruction codes to determine the coefficients of the kernel of the filters of the family of filters to apply to the raw image. The memory 18 comprises a zone 29 comprising instruction codes to determine a length of the filters of the family of filters. The memory 18 comprises a zone 30 comprising instruction codes to determine the number of filters of the family of filters to be generated. The memory 18 comprises a zone 31 comprising instruction codes to determine an orientation $\theta i$ at each filter of the family of filters a range of orientations lying within the interval $[-\pi/2, \pi/2]$.

The memory 18 comprises a zone 32 comprising instruction codes to break down a filter of the family of filters, according to the properties of separability, into two monodimensional filters. One of these two filters is constant and the second of these two filters is non constant. These two monodimensional filters have different directions. The memory 18 comprises a zone 33 comprising instruction codes to apply Bresenham's algorithm to each constant filter of orientation $\theta i$ from the breakdown of the filter to obtain a discrete constant filter of orientation $\theta i$. The memory 18 comprises a zone 34 comprising instruction codes to formulate the discrete constant filter of the zone 33 in a recursive manner, by performing a filtering operation defined by a recursive linear operation. The memory 18 comprises a zone 35 comprising instruction codes to combine the responses provided by all of the oriented filters of the initial filter, thereby obtaining an image of combined responses.

The memory 18 comprises a zone 36 comprising instruction codes to carry out a step of normalization of the combined responses in order to make them interpretable. The memory 18 comprises a zone 37 comprising instruction codes to determine a contrast to noise ratio threshold. This zone 37 further comprises instruction codes to implement a confidence map in which is attributed, to each pixel of the image, the normalized value of the calculated contrast to noise ratio, if said ratio is greater than the threshold, as well as an attribute of longilinear pixel; if not, it is attributed to the pixel corresponding to the value zero, as well as an attribute of non longilinear pixel.

The memory 18 comprises a zone 38 comprising instruction codes to provide an orientation image in which the orientation of the filter providing the strongest response is attributed to each pixel.

The memory 18 comprises a zone 39 comprising instruction codes to divide the initial two-dimensional filter into two two-dimensional filters of the same length, having the same properties as the initial filter, when the guiding equipment is of curved shape. This division is carried out at the centre of the initial two-dimensional filter. This zone 39 further comprises instruction codes to compare the responses of the two two-dimensional filters divided for each pixel of the image. This zone 39 contains codes to calculate a response of a filter from the responses of the two filters stemming from the division.

The equipment to be detected are thin and flexible rods or tubing placed in any orientation, in the body of the patient. For the detection of this guiding equipment of longilinear shape in the raw image, the control logic implements specific filters enabling their detection. To do this, the control logic creates a family of filters, a filter for each orientation $\theta i$, to detect all of the pixels of this equipment. This guiding equipment may be, among others, guides, catheters or vascular endoprotheses.

Figure 3:
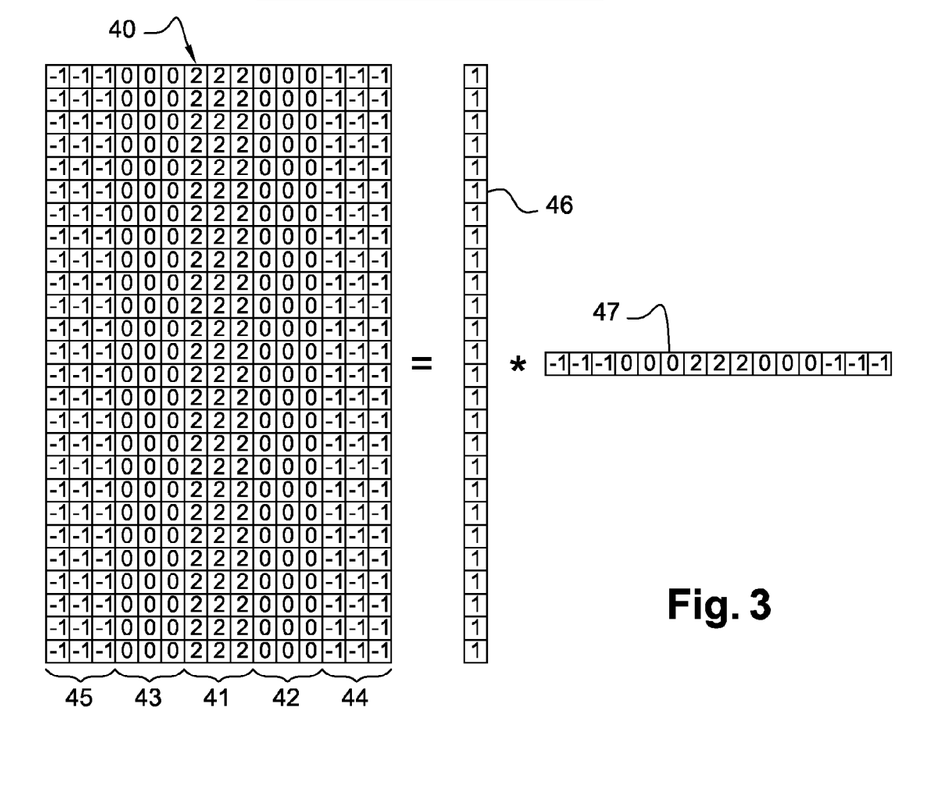
FIG. 3 shows an illustration of a breakdown of the kernel of the filter of FIG. 2, by using the properties of separability, as set forth in an embodiment of the invention.
Figure 4A:
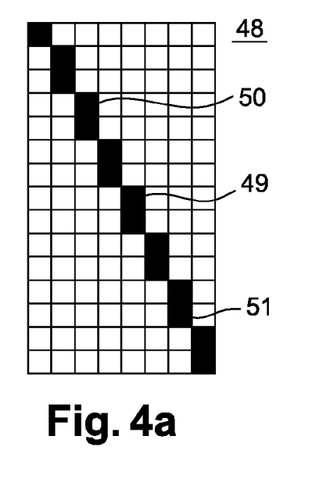
FIG. 4a shows an illustration of a formulation in a recursive manner of the broken down filter of FIG. 3 applied to a given pixel of the image, for any orientation of the filter, as set forth in an embodiment of the invention.
Figure 4B:
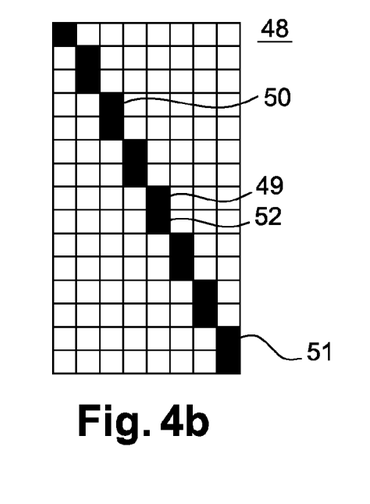
FIG. 4b shows a formulation in a recursive manner of the broken down filter of FIG. 3 applied to the pixel following that of FIG. 4a, for the same orientation of the filter as that of FIG. 4a, as set forth in an embodiment of the invention.

In order to make the disclosure of embodiments of the invention easier to understand, a vertical filter (see FIG. 2) having the essential properties of separability and recursivity (see FIG. 3) will firstly be described, before generalizing these properties to any orientation $\theta i$ of a filter of the family, as illustrated in FIGS. 4a and 4b.

Figure 2:
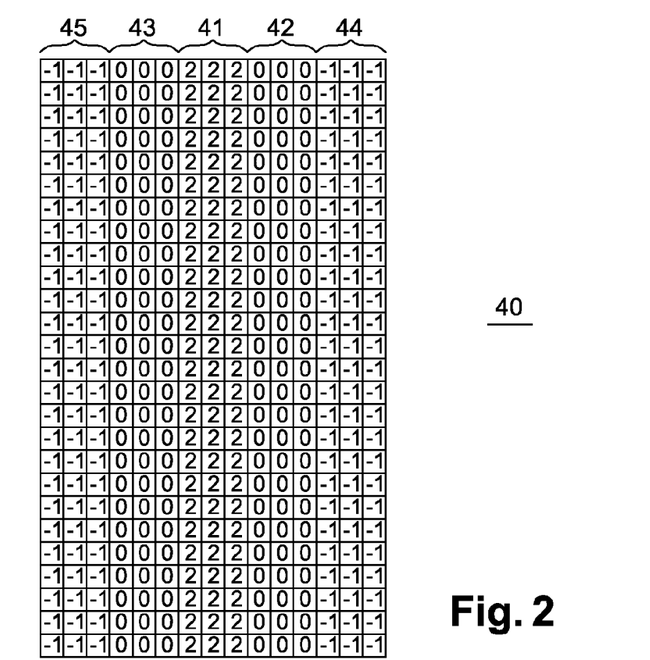
FIG. 2 shows an example of a convolution kernel of a vertical filter as set forth in an embodiment of the invention.

FIG. 2 shows an example of a convolution kernel of a vertical filter of the family of filters generated by an embodiment of the invention. In the example of FIG. 2, the kernel of the filter has a vertical direction and an orientation $\theta=0$.

The convolution kernel 40 is a matrix of coefficients, preferably square and of size well below the size of the image. The coefficients of the kernel are applied through weighting to the numerical values of a group of pixels of same size as the matrix. The pixel, at the centre of the matrix, is assigned a value, known as a filtered value, corresponding to a combination of these weighted values, generally the sum.

Determination of the Parameters of the Vertical Filter:

The control logic determines the coefficients of the filter that are identical for any orientation $\theta i$ of said filter, the length L of the filter and the orientations $\theta i$ of the filter to be generated.

Determination of the Coefficients of the Filter:

At a given orientation $\theta i$, i belonging to the interval [1, n], n being equal to the number of filters of the family of filters to be generated by the control logic, the kernel 40 of the contrast measurement vertical filter may be defined in a preferred example as follows: on a central block 41 of size w and length L, the value of the coefficients is equal to 2.

On two intermediate blocks 42 and 43 located on either side of the central block 41, the value of the coefficients is equal to zero. The two intermediate blocks 42 and 43 have a size equal to g and length L.

On two final blocks 44 and 45 situated respectively next to two intermediate blocks 42 and 43, the value of the coefficients is equal to −1. The two final blocks 44 and 45 have a size equal to w and length L.

With the aim of using an algorithm with as rapid an implementation as possible, the control logic chooses the values 2 and −1 for the coefficients of the kernel of the filter. These values are particularly useful, since they only require a bit shift and addition operations instead of multiplications as used in the background art.

In practice, this filter calculates the difference between the central block 41 and the final blocks 44 and 45, far from the central block. When this filter is applied to an image comprising a guiding equipment, it will calculate the contrast of said equipment. The greater the length of the filter L, the greater the reliability of this measured contrast, since the integration of the pixels reduces the noise. In the absence of guiding equipment, the output result is equal to zero as long as the underlying background varies linearly. Indeed, the filter (−1, 2, −1) is a second derivative that returns zero for any constant or linear signal.

The intermediate blocks 42 and 43 of zero coefficients are used to take into account the uncertainty concerning the size of the guiding equipment. This makes it possible to use a single filter that is efficient for many instruments such as guides and catheters, from different manufacturers and of different shapes.

The parameters of the filter are determined by the control logic in order to be adapted to the radioscopic images. Depending on the standard properties of the guiding equipment, the size w=3 pixels is particularly suitable. Indeed, this size of 3 pixels is an approximation of the width of a guide in a standard radioscopic image. It is a good compromise for example for catheters, in the case where they are modeled as empty cylinders.

Determination of the Length L of the Filter:

The filter determined by the control logic must firstly fulfill the execution time condition, and secondly, not violate the curvature of the guiding equipment.

The length L of the filter may be determined in several ways. In a preferred example, the control logic chooses a length of the filter that does not depend on the orientation of the filter. This chosen length will be that of each filter of the family.

The length of the filter is also determined by the control logic, as a function of the curvature of the objects to be located. The length L of the filter is preferably as long as possible. The longer the filter, the less one is affected by the problem of noise present in the image to be processed. Indeed, the greater the length of the filter, the more the integration dimension increases. The integration reduces the noise in proportion to the square root of the length L of the filter. The only parameters that limit the length of the filter to apply are the curvature of the objects to be detected and the execution time.

For example, for a cardiological intervention, the maximum appropriate length with the curvature of the guiding equipment is between 30 and 40 pixels. For a neurological intervention, where the guiding equipment is more curved because the vessels in the brain are more convoluted, the maximum appropriate length is between 10 and 20 pixels.

Determination of All the Orientations $\theta i$ of the Filters to be Generated:

The orientations $\theta i$ of the filters to be generated are determined within the interval $[-\pi/2, \pi/2]$. In practice, these orientations are chosen regularly spaced within the interval $[-\pi/2, \pi/2]$.

Determination of the Number of Filters to be Generated:

In a preferred example, the number of filters of the family of filters to be generated is (2*L−2)/w when g=0. This makes it possible to obtain a family of filters where there is no encroachment between two filters of the family at their ends.

FIG. 3 shows an illustration of the result of the application of the property of separability to the vertical filter of FIG. 2, as set forth in an embodiment of the invention. In the background art, the control logic convolutes the filter 40 of length L to the image to measure the contrast of the pixels of the image. However, the use of this type of filter considerably increases the calculation time of the control logic. Indeed, for a pixel of the given image, the control logic calculates $L^2$ multiplication and $L^2-1$ addition.

Property of Separability of the Vertical Filter:

To reduce the calculation time, the control logic uses properties of separability to apply to the filter for each orientation $\theta i$ of the filter. A two-dimensional filter is termed separable if it is possible to break down the kernel of the filter into two mono-dimensional filters applied successively.

The two mono-dimensional filters formed according to the property of separability are constant along one direction and non constant along another direction. The orientation of a filter being considered herein as the angle that forms the direction in which the filter is constant with the Y-axis The control logic can thus independently process the lines and the columns of the raw image. The two-dimensional filter, chosen in the example of FIG. 2, is separable.

The vertical two-dimensional filter of FIG. 2 is broken down into two successive filters of one dimension. The vertical filter 40 is broken down on the one hand into a vertical constant filter 46, of length L, the coefficients of which are equal to 1 on each pixel. The vertical filter 40 is broken down, on the other hand, into a horizontal filter 47 that is equal to one of the lines of the vertical filter 40.

In a preferred example, the control logic defines that the size w of the central block 41 and the final blocks 44 and 45 is equal to the size g of the intermediate blocks 42 and 43. In one example, the sizes w and g are equal to 3 pixels. In this case, the horizontal filter has a kernel equal to −1−1−1000222000−1−1−1. This kernel may be broken down into two successive vertical filters, one, constant, is equal to 111 and the other −100000200000−1 has only 3 non-zero coefficients.

By using a separable filter, the control logic achieves a considerable saving in calculation time as illustrated in Table 1 below:

TABLE 1

|  | Number of additions | Number of multiplications by two | Number of sign changes |
|---|---|---|---|
| Direct convolution | $3*w*L - 1$ | $w*L$ | $3*w*L$ |
| Using the properties of separability | $(w - 1) + (L - 1) + 2$ | 1 | 1 | following pixel Pi+1, the control logic deducts the response F(Pi+1) of the vertical constant filter 46 of the following pixel Pi+1 from the response of the filter F(Pi) of the previous pixel Pi.

Let us note the pixel of lowest index taken into account in the calculation of F(Pi) as $P_{\_start}$. Let us note the pixel of highest index taken into account in the calculation of F(Pi+1) as P_end. Then $F(Pi+1)=F(Pi)-P_{\_start}+P_{\_end}$.

This formula is valid anywhere in the image, except for the edges of the image. By using such a treatment, the filter application to the image requires only two additions of pixels, instead of L-1 additions in a direct approach.

Thus, an embodiment of the invention optimizes the reduction of the calculation time by generalizing the property of separability and the property of recursivity to all orientations θi of the filter, generated by the control logic, while at the same time conserving for each filter the same coefficients as those described above and the same length L of filter.

FIG. 4a shows an example of generalized formulation of the property of recursivity for any orientation θi. With the aim of detecting different direction lines, the control logic generates filters similar to the vertical filter disclosed above, having orientations θi lying within the interval $[-\pi/2, \pi/2]$.

The filters of orientations θi to be generated by the control logic necessarily have the following properties namely:
the coefficients of the kernel are −1.0 or 2
the filter is separable, and
the filter may be formulated in a recursive manner.

With the parameters chosen by the control logic concerning the length L of the filter and the size w or g of the blocks of the kernel 40, the calculation time of said control logic is approximately 8 times less than the calculation time of the background art. This considerable reduction of the calculation time is solely due to the implementation of the breakdown of the filter. An embodiment of the invention optimizes this reduction of the calculation time by defining a property of recursivity applicable to the initial vertical filter.

Property of Recursivity of the Vertical Constant Filter:

The longer the filter, the greater the confidence level to assign to the detected pixels. However, the longer the filter, the more the calculation time increases. Furthermore, during a rotation to an orientation θi of the filter by interpolation of this filter, which is here vertical, the values of the coefficients of the kernel of the filter become real and are no longer uniquely 1. Thus, one loses the advantage of only having to carry out additions, and one has to introduce multiplications by floating numbers to calculate the image convoluted by the filter.

To resolve these problems, an embodiment of the invention implements an algorithm enabling the constant filter to be formulated in a recursive manner for any orientation θi of the initial filter, while conserving the property of separability of the filter and the coefficients −1.0 and 2 of the kernel of the filter.

The vertical constant filter 46, which is a part of the breakdown of the separable vertical filter 40, may be treated in a recursive manner. Indeed, in one example, let us consider a column of the image and note the ith pixel of this column as Pi. The filtering of Pi by the vertical constant filter 46 provides in output F(Pi). To calculate the contrast of the Generalization of the Property of Recursivity of the Constant Filter of Orientations θi.

The principal difficulty of the rotation of the constant filter is the change of the coefficient values of the kernel due to the interpolation. The operations are no longer in this case additions but multiplications increasing the calculation time.

The values that are obtained, if the constant filter is in rotation, will no longer be the simple coefficients 1, 0 and 2. Likewise, the property of recursivity cannot be used with a filter of any orientation. And the property of separability will not be exact either, although it may have good approximations.

To resolve these difficulties, an embodiment of the invention uses for any orientation θi of the filter, an algorithm enabling the constant filter to be transformed into a discrete recursive constant filter.

In the example of FIG. 4a, the vertical constant filter 46, obtained from the breakdown of the vertical filter 40, corresponds to the oriented constant filter 48 for a given orientation. The oriented constant filter 48 is transformed into a discrete constant oriented filter, for example, with Bresenham's algorithm. Bresenham's algorithm enables a discrete line to be drawn through the point of the image where the filter will be applied. On this line, as the drawing proceeds, the pixels are numbered.

Bresenham's algorithm, widely used to draw discrete lines, enables two points given by a segment to be connected, giving as best as possible the impression of being straight and having a constant thickness.

Bresenham's algorithm is a very conventional way to link two points by a segment over an entire raster. FIGS. 4a and 4b show in dark color the result of Bresenham's algorithm applied to a specific orientation.

Other algorithms enabling a discrete segment to be obtained can also be used.

The use of a discrete segment allows an embodiment of the invention to conserve the recursive formulation, during the application to the image of the oriented constant filter 48 for any orientation θi of the filter 40. The recursivity of the filters of orientations θi makes it possible to exempt the calculation times of the length L of the filter. Thus, the control logic can determine filters of any length, without affecting the calculation rapidity of the filter.

The responses provided by this discrete oriented filter 48 have elements in common. Indeed, knowing the previous response of the filter, the control logic can calculate the following response of the filter. Thereby, the control logic only performs two operations whatever the length L of the filter, apart from the initialization calculations on the edges of the image, which have a negligible calculation time. The family of filters is thereby orientable, inexpensive, recursive, separable, easy to implement and rapid.

FIG. 4a shows the application of the discrete filter 48 of orientation θi to a pixel 49 of the image. The control logic begins by the application of the filter of orientations θi with the image, at a position (x, y) of pixel 49 far from the edges of the image.

The control logic calculates an initialization parameter of the filter. To do this, the control logic calculates the sum of the (L−1)/2 pixels preceding a central pixel and the (L−1)/2 pixels following the central pixel along the discrete line (which is easier since the pixels have been numbered during the drawing of the line). The pixel preceding the pixel 49 along the discrete line is known as the central pixel. In other words, the control logic calculates the sum of the L consecutive pixels, along the discrete line of the filter, centered on the pixel preceding the pixel 49 along the discrete line.

At the following position (x, y), the central pixel is displaced to the pixel 49 of the discrete line. The control logic determines the pixel 50 preceding the central pixel of (L-1)/2-1 pixels and the pixel 51 following the central pixel of (L-1)/2 pixels. The control logic calculates the response R(49) of the filter to the central pixel. R(49)=initialization parameter−pixel 50+pixel 51.

FIG. 4b shows the application of the discrete filter 48 of orientation θi to the pixel 52, following the pixel 49 along the discrete line. The control logic shifts the central pixel to the following position provided by Bresenham's algorithm. The pixel 52 becomes the central pixel. One determines once more the pixels 50 and 51.

The control logic applies the discrete filter 48 to the pixel 52 and provides in output the response R(52). The response R(52) is equal to the previous response (R49) of the filter, from which one subtracts the value of the pixel 50 and to which one adds the value of the pixel 51.

In this type of filter, known as recursive, one uses, in the calculation, former output values of the filter. The output of the recursive filter depends on the input and the previous output value.

With the aim of doing the same for each of the pixels of the image, the control logic translates the discrete lines along one of the axes, so that none of them ever covers another pixel. The control logic calculates the response of the filter in one translated pixel of the discrete line by using the same recursive procedure as in that of FIG. 4a.

This procedure makes it possible to calculate the response of the application of a constant filter under an orientation θi given to an image, by a recursive method.

In an alternative embodiment, the recursivity may be performed while respecting the order in which the pixels are stored in the data memory. For a rapid implementation on a conventional architecture, the control logic reads the image in the natural order of storage of the pixels in the data memory. An image is generally saved in consecutive rows and consequently the adjacent pixels in the memory will usually be placed in the same row.

The procedure for applying the filter described in FIGS. 4a and 4b may be performed by processing the pixels one after the other in their order of storage in the data memory, if one provides it with the necessary information such as the previous response of the filter. In this case, the control logic uses three buffer memories 55, 56 and 57 in the data memory 19, as illustrated in FIG. 1. In each buffer memory 55, 56 and 57, the control logic respectively saves the coordinates of the pixels 50 and 51 and the previous response of the filter. These buffer memories 55, 56 and 57 may be in line or in column according to the orientation of the filter. In a preferred example, the buffer memories 55, 56 and 57 have three lines or three columns. In an alternative embodiment, the buffer memories 55, 56 and 57 may comprise 3 to 6 pixels in line and 2 to 3 pixels in column.

Depending on the lines or the columns of the buffer memories 55, 56 and 57, the control logic calculates the shift for the pixel 50 from the start and the pixel 51 from the end of the filter. This shift changes according to the position of the central pixel of the filter.

The buffer memories 55, 56 and 57 are incremented at the same time for the following pixel of the image. This makes it possible to calculate the response of the filter on the image in a sequential manner.

The control logic thus preserves the property of recursivity for any orientation θi of the filter.

Generalization of the Property of Separability of the Vertical Filter to Filters of Orientations θi:

The control logic generalizes in the following manner the property of separability to all the orientations θi of the filter.

In the case where the orientation θi of the filter is included within the interval [−π/4, π/4], the control logic considers that the kernel of the filter of orientation θ=π/2 complementary to the constant line filter described above, is equal to [−1-1 ... w times, 00 ... g times, 22 ... w times, 00 ... g times, −1-1 ... w times].

In the case where the orientation θi of the filter is included within the interval [−π/2, −π/4[U ]π/4, π/2], the control logic considers that the kernel filter of orientation θ=0 complementary to the constant line filter described above, is equal to [−1-1 ... w times, 00 ... g times, 22 ... w times, 00 ... g times, −1-1 ... w times].

Applying the filter of orientation θi of the family therefore comes down to successively applying the recursive discrete constant filter of orientation θi then the complementary filter.

Each filter of the family of an embodiment of the invention satisfies all of the conditions and it has a better approximation when the filter is longer, for example, when L/(3 w+2 g) is high.

Each filter of the family of an embodiment of the invention, as described, particularly satisfies the properties of recursivity, of separability, of simple coefficients, of sum of coefficients equal to zero, of zero response to a linear contrast. Each filter of the family of an embodiment of the invention is also adapted to detect oriented lines, providing a response proportional to the contrast of the line in the image.

In one example, for a length L of filter equal to 40 pixels, the control logic generates a family of 25 filters of orientations θi. These filters are all separable, recursive and rapid.

The control logic applies to the raw image the set of steerable filters generated. Each filter of the set of steerable filters is designed to react strongly to the presence of structures having a given dimension and orientation.

The filters of an embodiment of the invention have coefficients that enable zero responses to be provided when the background is flat or linear. Their responses do not depend on variations in the background of the image, which are slow variations and of low frequency.

Moreover, for a given pixel of the raw image, the control logic calculates the 25 responses of the 25 filters. To obtain a single image instead of 25, the control logic uses an algorithm for combining the responses of the filters.

To do this, the control logic determines, for each pixel of the image, the steerable filter that provides the best response, in other words the highest contrast. For each filter providing the highest contrast at a given pixel, the control logic assigns to this pixel the orientation of this filter. The control logic provides in output an orientation image corresponding to the image in which an orientation is attributed to each pixel.

Combination of Responses of Filters:

The structures to be detected by the control logic in the raw image are pixels belonging to the guiding equipment that are darker than the background of the image. Thereby, the control logic only takes into account the negative responses of the filters. The response provided by the filters is proportional to the input contrasts.

Consequently, for a given pixel, the control logic only takes into consideration the response of the filter producing the strongest negative response. The higher the response, the greater the contrast in this direction in input.

The control logic performs a combination of the responses of the filters. The combination of the responses may consist in taking the minimum response for each pixel of the image among all of the responses of the oriented filters for this pixel. The fact of taking the minimum response enables the noise of the image of combined responses to be reduced. The noise in the image of combined responses is less than the noise in each filtered image.

The combination of responses may consist in taking the maximum of the absolute values of the responses of the filters, when the pixels to be detected are just as well pixels of negative contrast as pixels of positive contrast.

The combination of responses may consist in taking the maximum of the responses of the filters, when the pixels to be detected are pixels of positive contrast.

Normalization of the Image of Combined Responses:

It is not easy to interpret the values of the image of combined responses and to know if they indicate whether there was locally a significant long structure or not. The combination of responses has an impact on the noise statistics. Thereby, the combination of responses provided by the filters cannot be interpreted directly.

With the aim of achieving a good interpretation of the combined responses, the control logic implements a normalization algorithm. This normalization algorithm depends on the probability of the reaction of the response of the family of filters in the random noise. This normalization step enables the background of the image to be returned to zero and to place the standard deviation of the noise at 1.

To do this, the control logic forms an image of random noise having for each pixel constant properties, same average and same standard deviation here noted $\sigma$, with realistic noise properties, for example, by taking into consideration the spatial correlation of the noise.

The control logic performs the filtering of the image of noise with all of the steerable filters generated. Then the control logic calculates the image of combined responses by applying the algorithm of combination of responses. The control logic extracts from this image of combined responses a mean parameter m and a standard deviation parameter $\sigma'$. Said mean parameter m and said standard deviation parameter $\sigma'$ are proportional to the standard deviation a of the initial noise.

The control logic normalizes the mean m in M and the standard deviation $\sigma'$ in $\phi$ by carrying out the following operations: $M=m/\sigma$ and $\phi=\sigma'/\sigma$. Thereby, for any given clinical sequence, characterized by a standard deviation of initial noise, noted B, the control logic calculates the image of combined responses, noted here IM. It then calculates a confidence map of pixels. This map is obtained by performing the following operation of normalization for each pixel pi:

$$map(pi)=(IM(pi)-M*B)/(\phi*B)$$

The value attributed to the pixels of the map is easily interpreted by the control logic. This value is interpreted as being equal to the contrast to noise ratio. Thus, in the confidence map the value attributed to each pixel is considered as being the contrast to noise ratio. This interpretation is due to the fact that in the image, the standard deviation of the noise is equal to 1 and the average is zero. This contrast to noise ratio is directly exploitable for a subsequent processing of the radioscopic images The normalization algorithm only depends on the statics on the input noise. As a result, this normalization may be performed beforehand and once and for all. Moreover, the normalization parameters are proportional to the standard deviation of the input noise.

For example, if the value of a given pixel of the map is equal to zero, the observed value is a value typical of the random noise. Consequently, one cannot consider that this pixel belongs to a longilinear object. It is almost certain that in this pixel there is nothing very interesting. Similarly, if the value of a given pixel of the map is equal to 4, the probability that such a response is produced in the noise is very low, since we are far from the mean of the noise of 4 standard deviations.

The control logic can use mathematical models or simulations to calculate with exactitude the probability that a given range of values stems from the random noise. Thereby, the control logic can determine a contrast to noise ratio threshold to apply to the image of combined responses. This threshold may be defined beforehand. When the value attributed to the pixel is greater than the threshold, the control logic assigns to the pixel an attribute of longilinear pixel and the corresponding contrast to noise ratio. If not, the control logic assigns to the pixel an attribute of non longilinear pixel and a zero value.

An attribute of longilinear or non longilinear pixel is a temporary and internal parameter of the control logic. In one example, the attribute may be a graphic annotation or a binary number.

Figure 5:
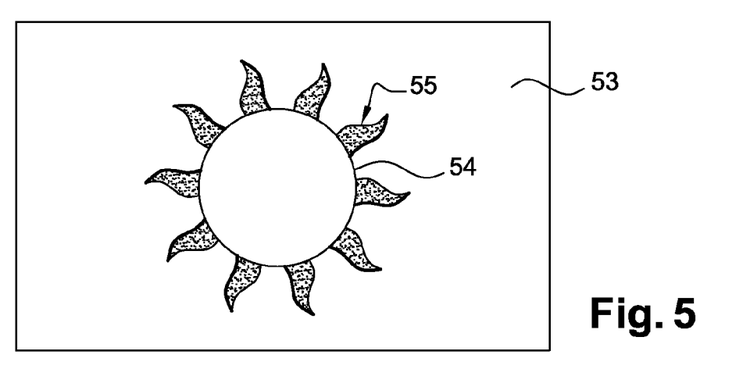
FIG. 5 shows a filtered image of a guiding equipment of round shape, as set forth in an embodiment of the invention.

Non-Longilinear Guiding Equipment:

A filter of an embodiment of the invention is suited to longilinear and hardly-contrasted guiding equipment. However, when the guiding equipment is very curved and very radio-opaque, the control logic provides an image of combined responses comprising artifacts, as illustrated in FIG. 5. FIG. 5 shows a filtered image 53, as set forth in an embodiment of the invention, of a very radio-opaque guiding element of round shape 54.

The guiding equipment sometimes comprises two beads of metal enabling the practitioner to know the position of the longilinear guiding equipment, which is hardly visible at all in the image and situated between the two beads. The beads inform the practitioner on the position of the guiding equipment in relation to the lesion. The beads of ball shape generally have a diameter of 5 pixels.

By using the directional filters of an embodiment of the invention, for each direction, the control logic provides responses with the same order of magnitude as the responses on a less contrasted longilinear object such as the guide. In the filtered image 53 obtained, the initial round bead 54 has become a star shaped bead 55.

According to the different applications of an embodiment of the invention, this star shaped bead 55 poses problems. Indeed, if this filtered image 53 is used to perform the noise reduction, one finds oneself with a whole non-noise reduced zone, sparkling around the bead 54.

An embodiment of the invention enables the star formed round the ball to be eliminated by adapting the filter of an embodiment of the invention. To do this, the embodiment of the invention uses a technique of filter divided into two. The control logic divides each filter of each orientation θi into two partial filters from their central kernel. These two partial filters have the same properties as said principal filter of orientation θi.

The control logic, for a given pixel, takes into account not only the sum of the respective responses G and H of the partial filters, as in the case of a longilinear equipment, but also the subtraction of respective responses G and H of the partial filters.

More generally, a filter of given orientation will supply a response that is f(G,H). This generalizes an embodiment of the invention described above for longilinear objects or f(G, H)=G+H. In a preferred embodiment f(G,H)=(G+H)×α(G+H,G−H), where a is a function defined beforehand. In a preferred embodiment $$f(G, H) = (G + H) \times e^{-\left(\frac{G-H}{K(G+H)}\right)^2}$$

where k is a parameter defined beforehand. K is a parameter that enables the shape of the type of object to be analyzed to be defined. For example, if K has a value close to zero, the type of object to be analyzed is a segment of rectilinear shape. The more the value of K increases, the more the object to be analyzed is of curved shape.

Figure 6:
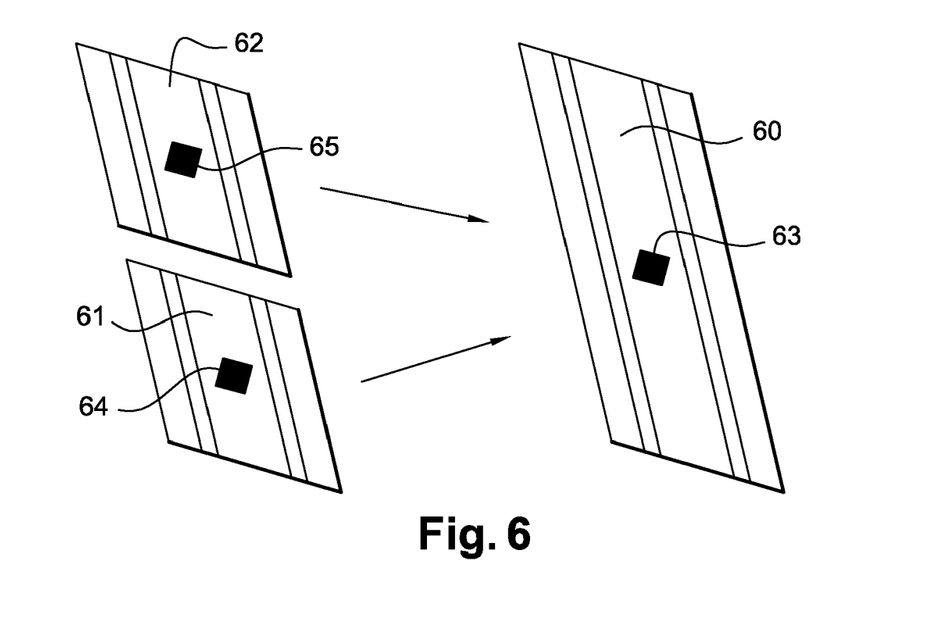
FIGS. 6 and 7 show two embodiments of a divided filter suited to detecting objects of non-longilinear shapes.
Figure 7:
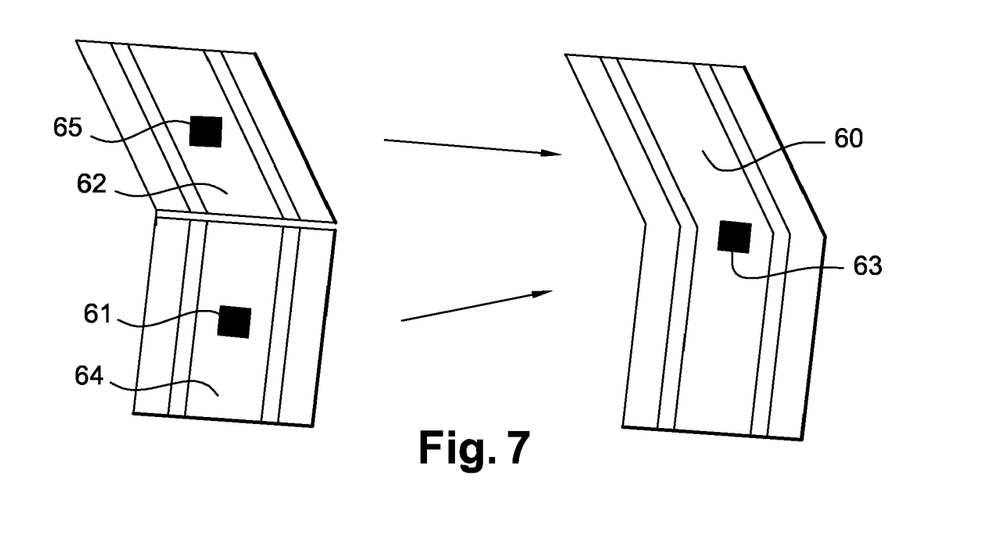

FIGS. 6 and 7 show two methods for calculating the response of the divided filter, as set forth in an embodiment of the invention, for non-longilinear objects. To calculate the response of the divided filter, the control logic firstly determines a family of half-filters of length L/2. This family of half-filters has the same properties as the family of filters defined in FIGS. 2 and 3.

The control logic applies each half-filter of length L/2 to the image, according to the method of application, of the filter of an embodiment of the invention to the image to be processed, defined in FIGS. 4*a* and 4*b*. The responses of the half-filters are stored in the data memory. The control logic then combines the responses of the half-filters obtained by the family of half-filters to obtain the response of the divided filters of length L.

The example of FIG. 6 shows in a schematic manner a first principle of calculating the divided filter response. In the example of FIG. 7, the control logic determines an orientation θi of the filter 60 to apply to the image. For this orientation θi, the control logic determines the two half-filters 61 and 62 of the family of half-filters having the same orientation θi.

To obtain the response of the divided filter 60 to the pixel 63 of the image, the control logic performs the following steps:
   It determines the discrete line of orientation θi going through the pixel 63 of the image.
   It determines the response G of the half-filter 61 in this pixel 63 of the image. To do this, it determines the position of the central pixel 64 of the half-filter 61 on the discrete line. Said central pixel 64 is situated at L/2 pixels before the pixel 63 on the discrete line. At this position of the central pixel 64 on the discrete line, the control logic selects the response G of the corresponding half-filter 61 among the responses G stored in the memory.
   Then, it determines the response H of the half-filter 62 in this pixel 63 of the image. To do this, it determines the position of the central pixel 65 of the half-filter 62 on the discrete line. Said central pixel 65 is situated at L/2 pixels after the pixel 63 on the discrete line. At this position of the central pixel 65 on the discrete line, the control logic selects the response H of the corresponding half-filter 62 among the responses H stored in the memory.
   Finally to calculate the response of the divided filter 60 to the pixel 63 of the image, the control logic combines the responses G and H according to a function f as previously described.

The example of FIG. 7 shows in a schematic manner a second divided filter response calculation principle. In this example, one combines the half-filters 61 and 62 of size L/2 of identical or different orientations to construct a divided filter 60 of size L. This divided filter 60 may be straight or curved. The fact of being able to obtain curved filters makes it possible to better detect the curvature of objects to be analyzed.

With an embodiment of the invention the divided filter 60 may have any curvature. The fact of having a family of filters capable of adopting all the possible curvatures increases the calculation time and the memory resources. Thereby, an embodiment of the invention comprises an algorithm suited to limiting the curvatures of the divided filter 60 to the curvatures of the physical object to be detected. Thus, in an embodiment of the invention, a threshold angle of tolerance is defined beforehand in order to limit the curvatures of the divided filter to the curvatures of the object to be analyzed. This threshold is then defined according to the type of medical tools used during the intervention. This threshold makes it possible to choose the half-filters to combine to obtain the divided filter 60 as a function of their orientations.

To select the half-filters, the control logic firstly determines the orientations θi and θj of the two half-filters 61 and 62 to combine to obtain a divided filter 60. Then, the control logic calculates the difference of orientations θi and θj of the two half-filters 61 and 62 to associate. Then, it compares this difference of orientation to the angle of tolerance threshold defined beforehand.

If this difference of orientation θi and θj is less than the angle of tolerance threshold, then the control logic can combine the responses of the corresponding two half-filters. The control logic applies each half-filter 61 and 62 of size L/2 to the pixel 63 of the image, so that one has the responses G and H of said half-filters of size L/2 for each orientation. These responses are stored in the data memory.

Then, the control logic calculates the response of the divided filter 60 to the pixel 63 on the image, by performing the following steps:
   It determines the discrete line of orientation θi going through the pixel 63 of the image.
   It determines the response G of the half-filter 61 in this pixel 63 of the image. To do this, it determines the position of the central pixel 64 of the half-filter 61 on the discrete line of orientation θi. Said central pixel 64 is situated at L/2 pixels before the pixel 63 on the discrete line. At this position of the central pixel 64 on the discrete line, the control logic selects the response G of the corresponding half-filter 61 among the responses G stored in the memory.
   Similarly, the control logic determines the discrete line of orientation θj going through the pixel 63,
   Then, it determines the response H of the half-filter 62 in this pixel 63 of the image. To do this, it determines the position of the central pixel 65 of the half-filter 62 on the discrete line of orientation θj. Said central pixel 65 is situated at L/2 pixels after the pixel 63 on the discrete line. At this position of the central pixel 65 on the discrete line, the control logic selects the response H of the corresponding half-filter 62 among the responses H stored in the memory.
   Finally, to calculate the response of the divided filter 60 to the pixel 63 of the image, the control logic combines the responses G and H according to a function f as described previously.

FIG. 6 is a specific case of FIG. 7.

Figure 8:
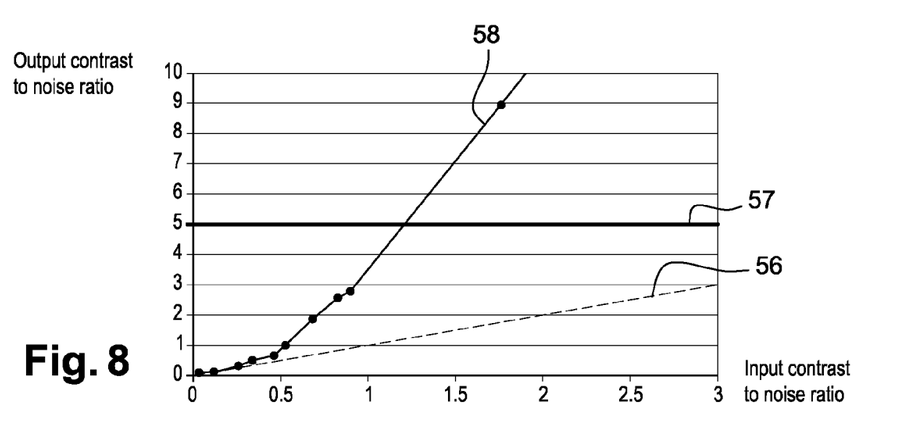
FIG. 8 shows, in a comparative graph, a contrast to noise ratio obtained with a method of the invention applied to a raw image and a contrast to noise ratio obtained with known means applied to the same raw image.

FIG. 8 shows in a comparison graph different contrast to noise ratio curves. The X-axis of the graph represents the input contrast to noise ratio of the control logic. These values are low and lie between 0 and 3. The Y-axis represents the output contrast to noise ratio of the control logic. These values are high and may be greater than 10.

The dotted line curve 56 illustrates the input contrast to noise ratio of pixels of the guiding equipment. It is an identity curve. The curve 58 illustrates the contrast to noise ratio of pixels of the guiding equipment as improved by an embodiment of the invention. For a thresholding with a percentage error less than 1%, the control logic calculates a threshold 57 equal to 5 in output contrast to noise ratio. The filter used here by the control logic is a filter of length L=41, with w=3 and g=0. Curve 58 shows that with very low contrast to noise ratios of around 1 in input, the contrast to noise ratio is significantly improved in output. It can be seen that the curve 58 is clearly above the curve 57 even for low contrast to noise ratios, which demonstrates the capacity of an embodiment of the invention to detect this guiding equipment. With an embodiment of the invention, whenever the object to be detected has a longitudinal structure, the output contrast to noise ratio is high.

Thus, objects not detected with a simple contrast to noise ratio measurement on the initial image are now detectable in the combined response image normalized by simple thresholding With an embodiment of the invention, whenever the contrast to noise ratio calculated for a given pixel is greater than the threshold, the control logic attributes this ratio to it, otherwise the control logic attributes a zero ratio to it.

This written description uses examples to disclose embodiments of the invention, including the best mode, and also to enable any person skilled in the art to make and use embodiments of the invention.

Although specific features of embodiments of the invention are shown in some drawings and not in others, this is for convenience only as each feature may be combined with any or all of the other features in accordance with the principles of the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

The invention claimed is:

1. A method for processing images produced by a medical imaging device, the method comprising:
   Determining, via a microprocessor, a family of two-dimensional directional filters to apply to a raw image representative of an internal structure of a patient's body, wherein the raw image is obtained from a radiation detector;
   determining for each filter of the family of two-dimensional filters an orientation $\theta_i$ within a range of orientations $\theta_i$ defined beforehand,
      wherein i belongs to an interval [1, n],
      wherein n is equal to a number of filters of the family of two-dimensional filters;
   wherein for each orientation $\theta_i$, the method further comprises:
      separating a corresponding filter into two mono-dimensional filters:
         a mono-dimensional constant filter along one direction, and
         a mon-dimensional non constant filter along another direction;
      formulating the mono-dimensional constant filter into a discrete mono-dimensional constant filter;
      formulating the discrete mono-dimensional constant filter in a recursive manner;
      successively applying to the raw image the recursive discrete constant filter and the non constant filter of said filter;
   combining all of the responses obtained by an application to the raw image of the filters of the family of two-dimensional filters; and
   producing a confidence map and an orientation image from the combined responses of the filters of the family of two-dimensional filters.

2. The method of claim 1, wherein the medical imaging device is a radiography device.

3. The method of claim 1, wherein the orientation $\theta_i$ of a filter of the family of two-dimensional filters corresponds to an angle that forms a direction in which the filter is constant with a Y-axis.

4. The method of claim 1, wherein combining the responses of filters further comprises:
   attributing, for each pixel of the raw image, a minimum response among all the responses of the filters of the family of two-dimensional filters for that pixel.

5. The method of claim 1, wherein combining the responses of the filters further comprises:
   attributing, for each pixel of the raw image, a maximum of absolute values of all of the responses of the filters of the family of two-dimensional filters for that pixel.

6. The method of claim 1, wherein combining responses of the filters comprises further comprises:
   attributing, for each pixel of the raw image, a maximum of the responses of all of the responses of the filters of the family of two-dimensional filters for that pixel.

7. The method of claim 1, wherein producing the confidence map further comprises:
   normalizing the combined responses of the filters as compared to an image of Gaussian noise defined beforehand;
   assigning to each pixel the result of the normalization obtained for said pixel, wherein the result of the normalization corresponds to a contrast to noise ratio;
   determining beforehand a contrast to noise ratio threshold;
   when the contrast to noise ratio of a pixel is greater than said threshold, assigning to the pixel an attribute of a longilinear pixel and said contrast to noise ratio; and otherwise assigning to the pixel an attribute of non-longilinear pixel and a zero contrast to noise ratio.

8. The method of claim 1, wherein each two-dimensional steerable filter of the family of two-dimensional filters comprises a kernel, in which values of coefficients are proportional and their sum zero.

9. The method of claim 8, wherein the kernel of the filters of the family of two-dimensional filters comprises:
   a central block of size w and length L, in which the value of the coefficients of this block is equal to 2;
   two intermediate blocks situated on either side of the central block of size g and length L and in which the value of the coefficients is equal to zero; and
   two final blocks situated respectively next to intermediate blocks of size w and length L and in which the value of the coefficients is equal to −1.

10. The method of claim 9, wherein the size w is equal to 3 pixels.

11. The method of claim 1, wherein the range of orientations $\theta_i$ lies within an interval $[-\pi/2, \pi/2]$.

12. The method of claim 1, wherein formulating the mono-dimensional constant filter into a discrete mono-dimensional constant filter further comprises:
   transforming, for each orientation the mono-dimensional constant filter into a discrete mono-dimensional constant filter by the application of Bresenham's algorithm to said mono-dimensional constant filter.

13. The method of claim 1, wherein recursively filtering the discrete constant filter with the image further comprises:
   storing the image in a data memory in consecutive rows;
   applying the mono-dimensional constant filter to the pixels in their order of storage in the data memory;
   applying the discrete constant filter using a recursive formula;
   saving in one or more buffer memories information necessary for the filtering of following pixels; and
   calculating a response of the filter on the image in a sequential manner.

14. The method of claim 1, wherein when the object to be detected is of curved shape and radio-opaque, the method further comprises:
   determining a family of half-filters of length L/2 of orientation $\theta_i$;
   convoluting the raw image with each half-filter of the family of half-filters;
   storing in a data memory responses provided by the half-filters; and
   comparing an orientation $\theta_i$ of a given half-filter to another orientation $\theta_j$ of another half-filter and so on;
   wherein if this difference of orientation $\theta_i$ and $\theta_j$ is less than a predetermined angle of tolerance threshold, then combining responses of two half-filters stored in the data memory to any pixel of the image to obtain a response of a divided filter in any pixel of the image.

15. The method of claim 14, wherein combining the responses of two selected half-filters into one pixel of the image further comprises:
   determining a discrete line of orientation $\theta_i$ going through a pixel of the image;
   determining a position of a central pixel of one of the two selected half-filters of orientation $\theta_i$ on the discrete line of orientation said central pixel being situated at L/2 pixels before the pixel of the image on the discrete line;
   selecting, at this position of the central pixel on the discrete line, a response G of said corresponding half-filter among the responses stored in the memory;
   determining the discrete line of orientation $\theta_j$ going through the pixel of the image;
   determining a position of a central pixel of the other of the two selected half-filters of orientation $\theta_j$ on the discrete line of orientation $\theta_j$, said central pixel being situated at L/2 pixels after the pixel of the image on the discrete line;
   selecting, at this position of the central pixel on the discrete line, a response H of said corresponding half-filter among the responses stored in the memory; and
   calculating a response of the divided filter to the pixel of the image, by combining, the responses G and H according to a function f defined as follows:
   $f(G,H)=(G+H) \times a(G+H,G-H)$ where a is a function defined beforehand.

16. The method of claim 15, wherein the function f is alternatively defined as follows:

$$f(G, H) = (G+H) \times e^{-\left(\frac{G-H}{K(G+H)}\right)^2}$$

where k is a parameter defined beforehand enabling the shape of the type of object to be analyzed to be defined.

17. A radioscopy device configured to perform the method of claim 1.

* * * * *

UNITED STATES PATENT AND TRADEMARK OFFICE
CERTIFICATE OF CORRECTION

PATENT NO. : 8,160,318 B2  
APPLICATION NO. : 12/139579  
DATED : April 17, 2012  
INVENTOR(S) : Bismuth et al.

Page 1 of 1

It is certified that error appears in the above-identified patent and that said Letters Patent is hereby corrected as shown below:

In the Specifications:

In Column 9, Lines 14-41, delete "following pixel....................recursive manner." and insert the same in Column 10, at Line 6, after "contrast of the" as a continuation of the paragraph.

In Column 13, Line 47, delete "a of the" and insert -- $\sigma$ of the --, therefor.

In Column 15, Line 4, delete "× α(G+" and insert -- × a(G+ --, therefor.

In the Claims:

In Column 17, Line 64, in Claim 1, delete "mon-dimensional" and insert -- mono-dimensional --, therefor.

In Column 18, Line 31, in Claim 6, delete "comprises further comprises" and insert -- further comprises --, therefor.

In Column 19, Line 4, in Claim 12, delete "orientation" and insert -- orientation $\theta_i$, --, therefor.

In Column 20, Line 5, in Claim 15, delete "orientation" and insert -- orientation $\theta_i$, --, therefor.

Signed and Sealed this  
Fourteenth Day of May, 2013

Teresa Stanek Rea  
*Acting Director of the United States Patent and Trademark Office*